Sept. 28, 1965     W. F. RIVERS     3,208,799
DRY MATERIAL TRANSFER APPARATUS
Filed Aug. 16, 1962     2 Sheets-Sheet 1
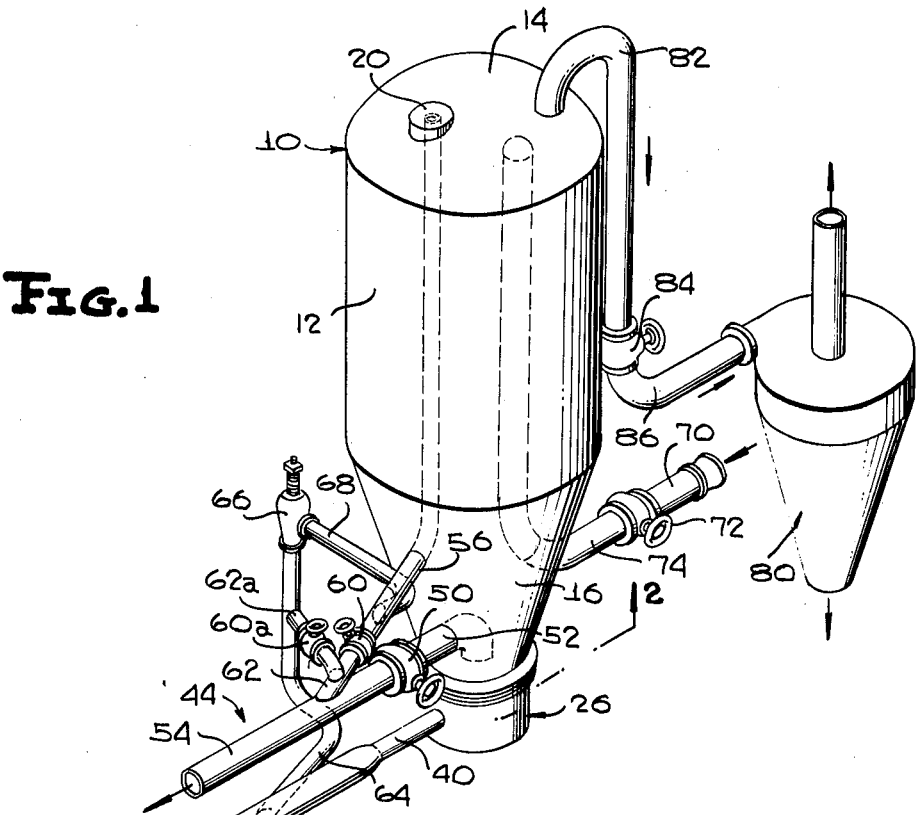
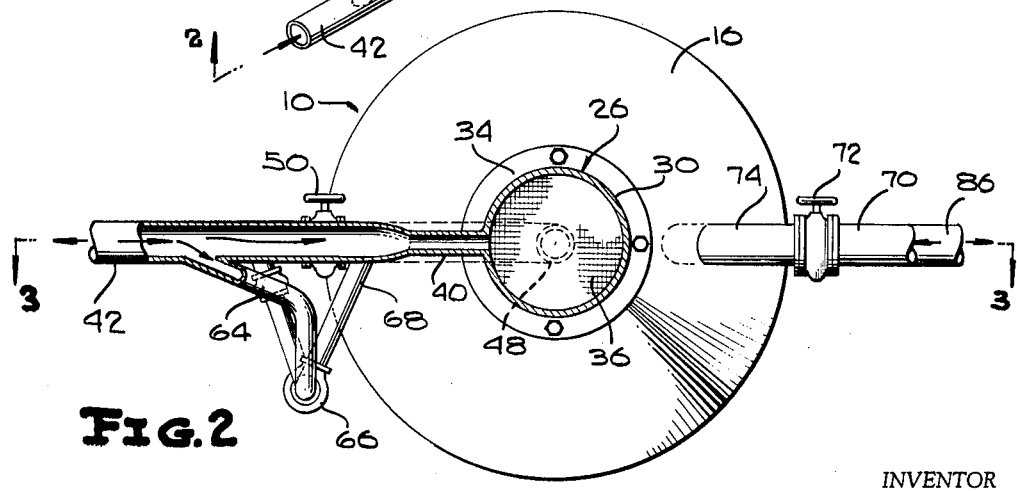
INVENTOR
WILLIAM F. RIVERS
BY *Shoemaker and Mattare*
ATTORNEYS Sept. 28, 1965 W. F. RIVERS 3,208,799
DRY MATERIAL TRANSFER APPARATUS
Filed Aug. 16, 1962 2 Sheets-Sheet 2
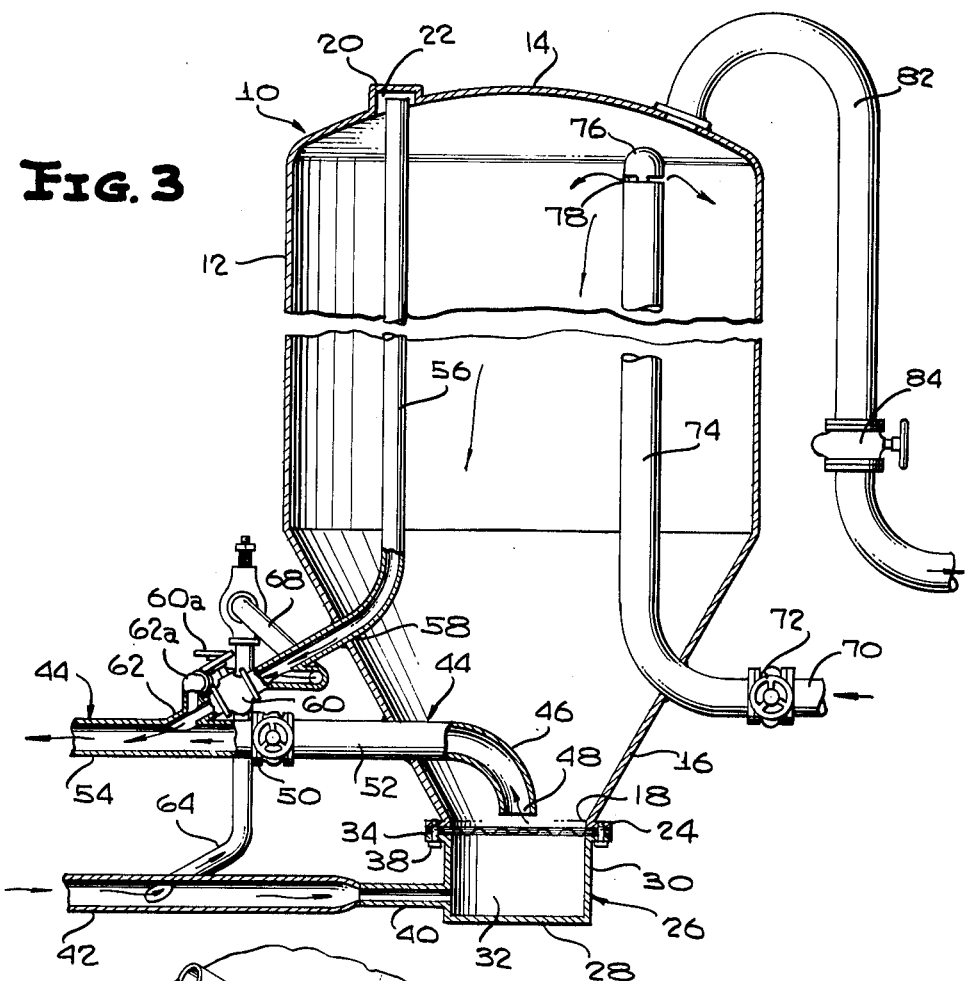
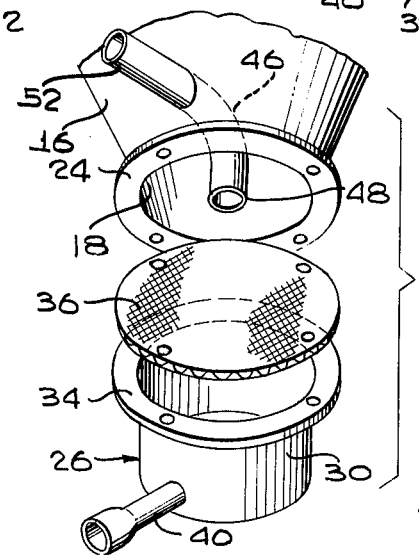
INVENTOR
WILLIAM F. RIVERS
BY *Shoemaker and Mattare*
ATTORNEYS

United States Patent Office 3,208,799
Patented Sept. 28, 1965

3,208,799
DRY MATERIAL TRANSFER APPARATUS
William F. Rivers, Caddo County, La., assignor of one-fourth to Luke A. Mattare, Potomac, Md., one-fourth to James W. Dent, Silver Spring, Md., one-fourth to Donald J. Rich, Silver Spring, Md., and one-fourth to John F. Smith, Chillum, Md.
Filed Aug. 16, 1962, Ser. No. 217,430
4 Claims. (Cl. 302—17)

This invention relates generally to material handling and is directed particularly to improvements in apparatus for handling dry fluent materials.

A particular object of the present invention is to provide material handling and transferring apparatus embodying a large capacity receptacle in which the dry fluent material may be placed for storage and from which such material may be withdrawn as desired without packing or caking in the withdrawing or lead-off conduit.

Another object of the invention is to provide apparatus of the character stated embodying the use of a large capacity storage receptacle in which dry fluent material of any nature, such, for example, as cement, flour, sugar, or any other granular or pulverulent material, may be placed for storage and wherein means is provided for fluidizing such material in the storage receptacle when the material or a part thereof is to be withdrawn, and conveying the material out of the receptacle on a fluidizing stream of air or other dry gas so that such powdered material can be extracted from the storage receptacle in a free flowing stream and conveyed to a desired point of disposal.

A still further object of the invention is to provide in apparatus of the above described character a means for extracting the fluidized pulverulent or granular material from the lower part of the receptacle under the effect of a reduced pressure in the withdrawing conduit and continuing the conveyance of the material through the conduit in an airborne stream and of also withdrawing any of the material which may rise to the top of the storage receptacle as a dust and conveying the same away in the airborne stream.

A still further object of the invention is to provide in a material storage and transfer apparatus of the character stated, a means for delivering the dry pulverulent or granular material into the storage receptacle and for drawing off, during such delivery, from the top of the receptacle, any airborne dust which may be produced.

The invention broadly contemplates the provision of a large capacity storage receptacle having at the bottom thereof an air pressure chamber which is divided from or separated from the interior of the receptacle by an air permeable wall.

For the removal of material from the receptacle there is provided a conduit leading through the wall of the receptace and having a downturned intake end which is disposed above and in relatively close proximity to the air permeable wall of the compressed air chamber.

Means is provided for introducing air, or other suitable dry gas, under pressure into said air pressure chamber whereby the air will diffuse upwardly through the air permeable wall and effect the fluidization of the dry material. At the same time that the air is being diffused through the air permeable wall, the pressurized air is introduced into the lead-off conduit, from the air supply pipe, in a manner to create a reduced pressure at the intake end of the lead-off pipe and in a direction to create an air flow in the lead-off pipe away from the intake end thereof whereby the fluidized material will be drawn into the intake pipe and picked up in the air stream to be conducted from the storage receptacle.

The introduction of the material conveying air into the lead-off conduit is controlled by a regulating valve which opens at a predetermined pressure.

Means is also provided for extracting any air suspended powder or dust from the storage receptacle and leading it into the lead-off conduit simultaneously with the extraction of the fluidized material through the conduits from the lower part of the receptacle.

Means is also provided for filling the storage receptacle by discharging the material into the top part of the receptacle and with this is provided a means for extracting any air suspended particles or dust and collecting the same by suitable means as, for example, by a conventional cyclone separator.

In addition to the foregoing a means is provided for pressurizing the top of the storage receptacle in the event of the bridging of the material in the receptacle, while the material is being withdrawn.

The invention will be best understood from a consideration of the following detailed description taken in connection with the accompanying drawings forming a part of the specification and wherein:

FIG. 1 is a view in perspective of a dry material handling apparatus constructed in accordance with the preferred form of the present invention.

FIG. 2 is a sectional view taken in a horizontal plane and on an enlarged scale, substantially on the line 2—2 of FIG. 1.

FIG. 3 is a sectional view, on an enlarged scale, taken substantially in the vertical plane of section line 3—3 of FIG. 2.

FIG. 4 is an exploded perspective view of the lower portion of the storage receptacle and the air pressure chamber and diffusing means or air permeable wall.

Referring now more particularly to the drawings wherein like numerals of reference indicate corresponding parts throughout several views, the numeral 10 generally designates a storage receptacle in which the desired dry fluent pulverulent or granular material is placed and from which it may be extracted in a free flowing stream by the novel means hereinafter described.

This receptacle 10 is preferably of a large capacity as, for example, it may be designed to receive and store as much as several hundred barrels of the material. In connection with this statement, however, it is to be understood that this is in no way limiting with regard to the size of the receptacle as the invention may be as efficiently used in association with a receptacle or storage container of small size if desired.

The receptacle is here shown as being of circular cross section and embodying the cylindrical upright wall 12, the top wall 14 and the conical lower or bottom wall 16 leading to and terminating in the mouth opening 18.

While a receptacle of circular cross section has here been illustrated it is also to be understood that the invention is not limited to this spscific design as it will be readily apparent that such receptacle may be square or of any other cross sectional configuration and have a bottom wall of conical form such as that here illustrated.

The top wall 14 is provided with the upstanding blister 20 forming a downwardly opening chamber 22 which is in communication with the interior of the receptacle, for the purpose hereinafter set forth.

The mouth opening 18 is encircled by the outstanding or outwardly directed flange 24 by means of which there is secured to the bottom wall 16, an air pressure box generally designated 26, having the bottom wall 28 and surrounding side wall 30 and providing an air pressure chamber 32, having an open top encircled by the outwardly projecting flange 34 formed integral with the side wall 30 and of approximately the same diameter as the flange 24.

The flanges 24 and 34 have secured between them an air permeable wall 36, formed of a suitable material through which air may be diffused upwardly into the receptacle.

The wall 36 may be formed of a suitable material through which air can pass at the desired rate to fluidize pulverulent material stored in the receptacle. One such material which may be used for the wall 36 is canvas of suitable weight or thickness for accomplishing the desired result.

The air permeable wall 36 is in the form of a flat disc as shown and is located between the flanges 24 and 34 as stated and the flanges are secured together and tightly grip the peripheral portion of the wall 36, by suitable bolts or screws 38 which pass through the disc in the manner illustrated in FIG. 3. Thus the air box is joined in an air-tight manner to the mouth opening 18 of the receptacle.

The wall 30 of the air pressure box 26 has connected therewith and opening thereinto one end of a pipe or tube 40 which at its outer end is connected to the end of a pipe 42 of larger diameter and which constitutes an air supply pipe through which air is conducted under pressure into the chamber 32.

The numeral 44 designates a material lead-off conduit which extends through the lower or bottom wall 16 of the receptacle as shown.

Within the receptacle the conduit 44 has a terminal portion turned or curved downwardly as indicated at 46 and the open intake end 48 thereof is directed toward the air permeable wall 36 and is located in relatively close proximity to that wall as shown.

A control valve 50 is connected to the outer end portion 52 of the lead-off conduit and the lead-off conduit is continued in the pipe section 54 which is joined at one end to the opposite side of the valve 50 from the conduit section 52 as clearly shown in FIG. 3.

The numeral 56 designates a lead-off pipe which is disposed vertically within the receptacle as shown and which has its lower end portion extended through the bottom wall 16 as at 58.

The upper end of this lead-off pipe is located within the chamber 22 provided by the blister 20.

Exteriorly of the receptacle the pipe 56 extends downwardly toward the outer portion 54 of the lead-off conduit and is connected with the lead-off conduit through a control valve 60 with a short nipple 62 which is joined to and opens into the part 54 of the lead-off conduit on the downstream side of the valve 60.

As shown the coupling nipple 62 extends oblique to the axis of the conduit section 54 and leads into the conduit section in the direction away from the intake end of the lead-off conduit 44. Thus air injected into the lower end of the pipe 56, in the manner about to be described, will pass through the valve 60 and flow into the lead-off conduit in a direction to produce a reduced pressure at the intake end 48, when the valve 50 is open.

Numeral 64 designates an air take-off pipe connected at one end with the air supply pipe 42. The other end of this take-off pipe 64 is connected with a pressure operated regulating valve which is generally designated 66 and from which air is passed, when the valve is opened under the required pressure, into the feed pipe 68. This feed pipe is connected into the lead-off or draw-off pipe 56 on the upstream side of the valve 60 as shown in FIG. 3, and it discharges into the pipe 56 at an oblique angle directed toward the valve. Thus air entering under pressure into the lower end of the pipe 56 by way of the feed pipe 68 will have the effect of reducing the pressure in the upper part of the pipe 56 to thereby draw off any material which might be suspended in the air at the top of the receptacle 10.

Below or on the downstream side of the valve 60 the nipple 62 has connected therein, one end of a by-pass pipe line 62a. The other end of this line or conduit 62a is connected with the take-off pipe 64 below or on the upstream side of the valve 66.

This by-pass conduit or pipe 62a has connected therein the shut-off valve 60a, as shown. The purpose of the valve controlled by-pass conduit 62a will be hereinafter set forth.

The dry fluent material to be stored in the receptacle or tank 10 is fed to the receptacle from a truck, tank car or other source, by way of the pipe 70, through the cut-off valve 72, to a stand pipe 74, the lower end of which pipe passes through the bottom wall 16 of the receptacle and extends upwardly therein as shown. Preferably the top end of the stand pipe 74 is covered by a cap 76, supported on and spaced from the top end of the pipe 74 to provide the lateral discharge openings or slots 78.

Any means such as a pump, a blower or the like may be employed for transferring the fluent material from a carrier such as a truck, tank car or the like, to and through the pipe 70 and the stand pipe 74 for filling the receptacle.

The numeral 80 generally designates a separator of the well known cyclone type which is connected with the top part of the storage receptacle by means of the pipe 82. This pipe 82 which opens through the top of the receptacle as shown in FIG. 3, is connected with one side of the cut off valve 84, the other side of this valve being connected by the pipe 86 with the top of the cyclone separator as shown.

As will be readily obvious, the separator 80 would be operated during the period of filling the receptacle by way of the pipe 74, whereby to remove dust and air suspended particles from the upper part of the receptacle and also permitting air to be exhausted from the receptacle as the receptacle fills.

In the operation of the apparatus for removing the dry material from the receptacle or storage tank, air under suitable pressure is supplied to the pipe line 42 to flow into and fill the air chamber 32 and also to flow through the take off pipe 64 as hereinbefore described.

The air under pressure will pass upwardly through the permeable wall 36 into and through the dry material contained in the receptacle.

In the operation of extracting material from the receptacle, the valves 72 and 84 would be closed.

As the air flows into the material from the chamber 32 and upwardly through the material it will stir or elevate the material to keep it in a continuous fluid-like movement.

While the dry pulverulent material is in the fluidized condition the air taken off through the pipe 64 when under proper pressure, will effect the opening of the valve 66 and be discharged into the lower end of the pipe 56 in the downstream direction as indicated by the arrows, passing through the open valve 60 and into the lead-off conduit. The direction of flow of the air into the lead-off conduit will be away from the intake end 48 thereof and thus when the valve 50 is open a reduced pressure will be created in the intake end of the conduit section 52 and the air stirred, fluidized material will then be caused to flow into the lead-off conduit and will be picked up by the air stream entering by way of the nipple 62 and airborne through the lead-off conduit to the desired discharge area.

It will also be apparent from the foregoing that the suction effect created by the air discharged obliquely into the lower end of the pipe 56 and moving downwardly therethrough, will effect the drawing off of some air from the top of the receptacle so as to remove air suspended particles of the material from the top of the receptacle.

In the event of the bridging of material in the receptacle during the withdrawing operation use is made of the valved conduit 62a to loosen the bridged material so that withdrawal can proceed.

Any time such bridging takes place, the valve 60 is closed and this forces air into the line 56 to be discharged into the top of the receptacle, thereby forcing the material down into the conical lower portion 16.

While the air is being forced upwardly through the pipe line 66, in the manner stated, the valve 60a in the by-pass conduit is opened to permit air to flow into the nipple 62. This keeps the material going out through the conduit 54 in an airborne stream.

From the foregoing it will be seen that there is provided by the present invention a novel dry material transferring apparatus, by means of which stored dry material can be readily removed from the storage tank or receptacle in a continuous free flowing stream.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. Apparatus for handling dry fluent material, comprising a storage receptacle, means for conveying a dry fluent material into the receptacle, said receptacle having a downwardly tapering bottom wall leading to a mouth opening, means connected with said mouth opening for diffusing air under pressure into the receptacle through said mouth opening whereby to fluidize dry fluent material in the receptacle, a material lead-off conduit leading from within the receptacle and having an intake end positioned adjacent to said air diffusing means, a first shut-off valve in said conduit exteriorly of the receptacle, an air pipe having an open end in the receptacle adjacent to the top thereof, and having a lower end portion exteriorly of the receptacle and joining said conduit on the remote side of said valve from said intake end and at an oblique angle directed into the conduit away from said intake end, a second shut-off valve, said second valve being in said air pipe, conduit means connected at one end with and leading into said lower end portion of said air pipe on the side of said second valve remote from the lead-off conduit and directed into the pipe toward said second valve, means for supplying air under pressure into said conduit means, and a pressure regulating valve in said conduit means for opening and passing air at a predetermined pressure to said air pipe.

2. The invention according to claim 1, wherein said means for diffusing air into the receptacle comprises an air box having an air permeable top wall, said box means secured to said receptacle bottom wall with said air permeable wall over and sealed to the said mouth opening and a pressurized air conducting conduit connected to and opening into said box, and the said means for supplying air under pressure to said air conducting means being said pressurized air conducting conduit to which the said air conducting means is connected.

3. The invention according to claim 2, wherein the said air premeable wall comprises a sheet of woven fabric material.

4. Apparatus for handling a dry fluent material comprising a closed receptacle, means for conducting a dry fluent material thereinto, means connected with the lower part of the receptacle for fluidizing the material therein, means for removing the material while in the fluidized state comprising a lead-off conduit having an intake end located in the lower part of the receptacle to be imbedded in the material above the fluidizing means, a first shut-off valve in said conduit exteriorly of the receptacle, an air pipe having an open end in the receptacle adjacent to the top of the latter and having a lower end portion exteriorly of the receptacle and joining said conduit at an oblique angle and on the remote side of said valve from said intake end of the conduit and directed into the conduit away from said intake end, a second shut-off valve, said second valve being in said air pipe conduit means connected at one end with and leading into said lower end portion of said air pipe on the side of said second valve remote from the lead-off conduit and directed into the pipe toward said second valve, pipe means for injecting dry fluid under pressure into said lead-off conduit at an oblique angle thereto and directed away from said intake end of said lead-off conduit for withdrawing the material from the receptacle, said pipe means being connected at one end with said conduit means, a control valve in said pipe means, and a regulating valve in said conduit means between the said one end of said pipe means and said air pipe.

References Cited by the Examiner

UNITED STATES PATENTS

| | | | |
|---|---|---|---|
| 2,221,741 | 11/40 | Vogel-Jorgensen | 302—53 |
| 2,695,197 | 11/54 | Burtis | 302—59 |
| 2,924,489 | 2/60 | Beckman | 302—29 |
| 3,019,058 | 1/62 | Pro | 302—53 |

SAMUEL F. COLEMAN, *Primary Examiner.*

ANDRES H. NIELSEN, WILLIAM B. LA BORDE, *Examiners.*